COLOR TELEVISION MATRIX SYSTEM

Filed Sept. 20, 1954

INVENTOR.
Dalton H. Pritchard
BY
ATTORNEY

United States Patent Office 2,732,425

Patented Jan. 24, 1956

2,732,425

COLOR TELEVISION MATRIX SYSTEM

Dalton H. Pritchard, Princeton, N. J., assignor to Radio Corporation of America, a corporation of Delaware Application September 20, 1954, Serial No. 457,055

9 Claims. (Cl. 178—5.4)

The present invention relates to the matrixing of three component color television signals from two prescribed chrominance signals of predetermined phase as synchronously detected from a color television subcarrier signal. It also refers in particular to a circuit means for obtaining R–Y, G–Y and B–Y signals with I and Q operation from what are herein termed X and Z signals having a phase difference of 50.6° with the X signal leading the B–Y signal by a phase angle of 102.2°.

The method proposed for transmitting a color television picture is one based on a set of standards which were authorized by the Federal Communications Commission on December 17, 1953. These standards describe a composite color television signal which contains both the luminance information or monochrome information relating to the scene and also a color modulated subcarrier which, using the processes of synchronous detection, may be employed to provide color-difference or chrominance signals which describe how each color in the televised scene differs from the monochrome version of the color having the same luminance. It is therefore necessary in a color television receiver to provide means for not only demodulation of chrominance information, but also to provide matrix circuits which can be utilized to produce suitable combinations of chrominance signals so as to produce a desired set of color-difference signals which, when combined with the monochrome information, yield the recovered component color signals.

The present invention is devoted to a teaching of combined simplified demodulating and matrix means which accomplish this purpose in a novel and direct fashion.

In order to best appreciate the teachings of the present invention, consider in more detail the precise nature of the composite color television signal which conforms to the FCC standards. Three primary colors, red, green, and blue are utilized for a description of the color residing in the image to be transmitted. These three primary colors do not appear equally bright because they are located in different parts of the spectrum and hence stimulate different brightness sensations in the human eye. However, if the three primary colors are mixed in the right proportions, it is found that the green primary, which is located at the center of the visible spectrum, accounts for 59% of the brightness sensation while the blue and red primaries account for 11% and 30% respectively. Thus, utilizing a color television signal or Y signal according to the equation $$Y=0.30R+0.59G+0.11B \quad (1)$$

a monochrome signal may be produced; this monochrome signal is generated in accordance with the existing scanning standards.

In order to produce a composite television signal for the transmission to a color receiver, color signals designated as R–Y, G–Y, and B–Y are utilized which indicate, as previously described, how each color in the televised scene differs from the Y signal.

These color-difference signals may be written in the following way to constitute a set of three independent signals:

$$R\text{–}Y=0.70R-0.59G-0.11B \quad (2)$$

$$G\text{–}Y=-.30R+0.41G-0.11B \quad (3)$$

$$B\text{–}Y=0.30R-0.59G+0.89B \quad (4)$$

where Y is described by Equation 1. These equations cannot be solved for R, G, and B in terms of R–Y, G–Y, and B–Y, but they may be solved to yield any single chrominance signal in terms of the other two; for example $$G\text{–}Y=-0.51(R\text{–}Y)-0.19(B\text{–}Y) \quad (5)$$

The color-difference information is transmitted on a modulated subcarrier which contains not only the signals described by Equations 2, 3, and 4, but also describes a continuous change of hue as a function of angle or phase of the modulated color subcarrier. The process of recovering one or more of the color-difference signals is then to utilize the principles of synchronous detection wherein a locally generated signal in the receiver having the frequency of the color subcarrier, but, at a particular phase relating to the particular color-difference signal being detected, is heterodyned with the modulated color subcarrier to produce the desired color-difference signal.

In order to make the employment of the processes of synchronous detection possible, synchronizing means are provided; i. e. a color synchronizing burst is transmitted on the back porch of the horizontal synchronozing pulse. This color synchronizing burst has the frequency, 3.58 mc. of the color subcarrier, and is so phased that the burst leads the R–Y signal by 90° and the G–Y signal by 214.3°.

If a multiplicity of color-difference signals are required, then the processes of synchronous detection may be utilized to provide these signals. However, following from the concepts leading to Equation 5, for example, it is not necessary to demodulate more than two color-difference signals; the third color-difference signal is readily obtainable from suitable combination of the two demodulated color-difference signals. The teachings of the present invention are devoted to the principles and concepts which provide simplified matrix means which yield a trio of required color-difference signals from two color-difference signals.

The teachings of the present invention follow closely the teachings of the present inventor in his preceding application, "Color Television," bearing the U. S. Serial No. 432,413, filed May 26, 1954, which describes the use of a special trio of amplifiers having a common cathode and wherein the grid of one of said trio is grounded with the prescribed pair of demodulated signals applied to each of the other grids respectively. By choosing a pair of demodulated color-difference signals having a phase difference relationship of 50.6°, with one of the signals leading the B–Y signal by 102.2°, the R–Y, B–Y and G–Y signals are produced by the matrix.

In the invention described in the preceding application, relatively narrow bandwidth operation of the color television receiver was realized; however, as is well known in the art, the modulated color subcarrier contains what are known as I and Q signals. The I signal leads the R–Y signal by 33° with the Q signal lagging the I signal by 90°. The I signal is substantially a color difference signal along the orange-cyan axis and is a high definition signal having a bandwidth including components up to approximately 1½ mcs. The Q signal is a relatively narrow bandwidth signal describing color difference information along a green-purple axis involving signal components having a maximum upper frequency range of approximately ½ mc.

If the R–Y, B–Y, and G–Y color-difference signals, which are contained in the modulated color subcarrier, are demodulated directly at the phase corresponding to these color-difference signals, the resulting color difference signal will be limited to an upper frequency limit of ½ mc.; if the R–Y, B–Y, and G–Y color difference signals are formed by appropriate combination of demodulated color-difference signals which includes I signal, then, an upper frequency limit of 1½ mcs. may be realized.

By making provisions for utilization of so-called I and Q operation, the present invention then extends the teachings of the preceding application to permit the realization of the definition and advantages accrued from the utilization of I signal information. As will be described in the specifications to follow, the present invention yields the added definition inherent in the signal without the actual demodulation of the color subcarrier at the I and Q phases.

It is therefore a primary object of this invention to provide a simplified matrix for producing R–Y, G–Y and B–Y signals in a color television receiver wherein full utilization of the information contained in the transmitted signal is accomplished.

It is still another object of this invention to provide a means for producing a trio of color difference signals from a pair of chrominance signals which are not in phase quadrature and wherein the high definition inherent in the I signal is utilized.

It is yet a further object of this invention to provide a simplified matrix means for producing color difference signals in a color television receiver with full D.-C. restoration and with full utilization of the I and Q information contained in the transmitted signal.

According to the invention, a trio of amplifier tubes having a common cathode circuit is utilized. The grid of one of the trio is grounded, with the pair of demodulated signals having a phase difference of 50.6°, applied to the grids of the other two tubes, respectively. One of the signals leads the B–Y signal by 102.2° and the R–Y, G–Y and B–Y signals are produced in the output circuits of the trio of amplifier tubes. In order to permit utilization of the signal information which is transmitted with the I signal, it is recognized that one of the two signals, which herein will be called a Z color-difference signal, is very nearly equal to a —Q signal and that the second of the two signals, which herein will be called an X color-difference signal, is 50.6° in the counterclockwise direction from the Z color-difference signal, contains a component of —Q and a substantial component of —I. Two functions are performed; namely, (1) that of removing the frequency components above 500 kc. in the signal corresponding closely to the —Q signal, (i. e. the Z color-difference signal) and (2) the removal of the frequency components above 500 kc. in the Q component of the X color-difference signal thereby leaving only the I components in the region above 500 kc. These two functions are attained in the present invention by bypassing the frequencies above 500 kc. in the Z color-difference signal to ground with an appropriate RC circuit with a suitable time constant and by utilizing these very same frequency components above 500 kc. in proper polarity to cancel out the Q signal components above 500 kc. in the color-difference signal, leaving only the I components extending out to 1.5 mcs. thereby resulting in I and Q type of operation.

Other and incidental objects of the present invention will become apparent upon a reading of the following specification and a study of the figures wherein.

Figures 1, 2:
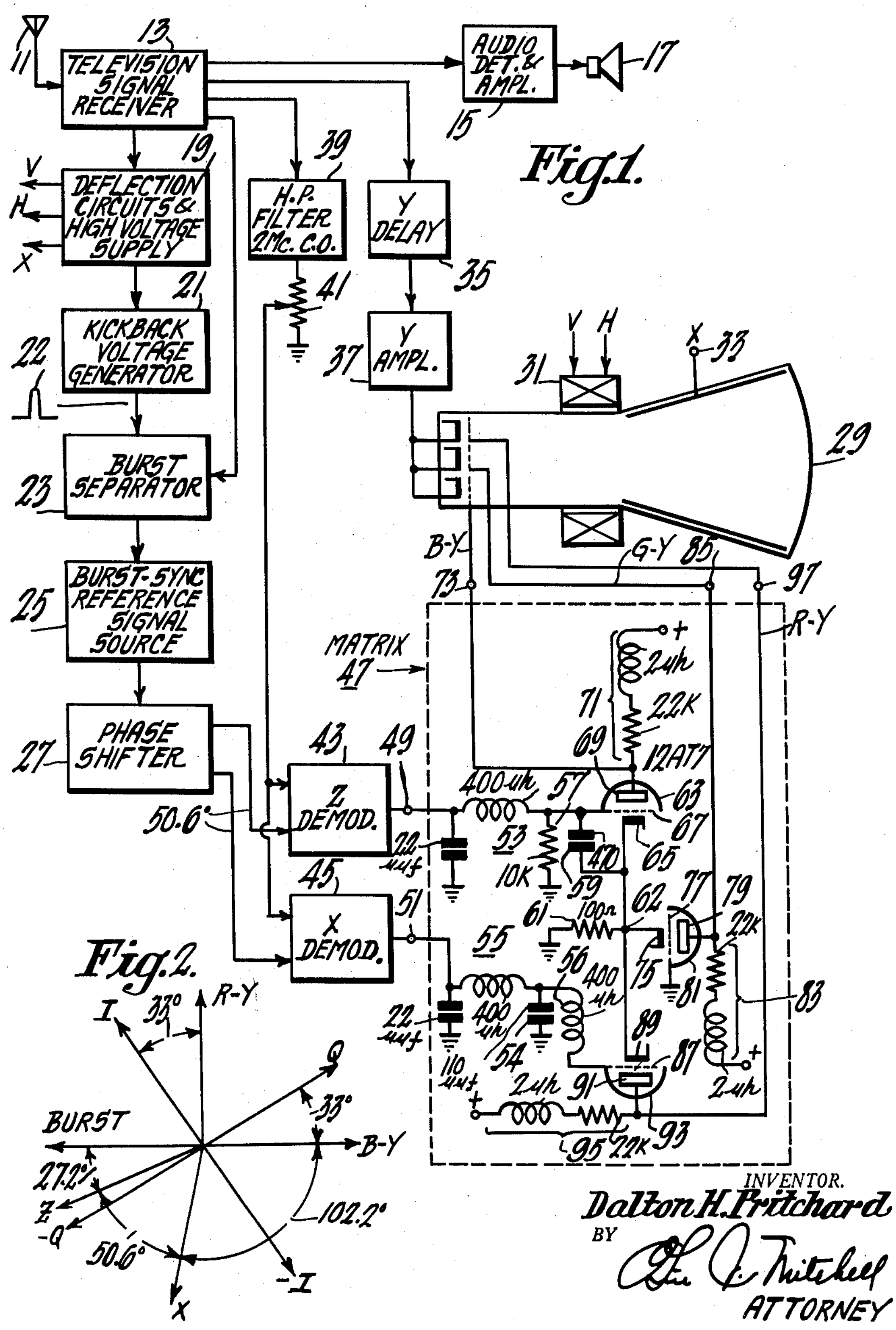
Figure 1 shows a block diagram of a color television receiver into which has been included a schematic diagram for a matrix which represents one embodiment of the present invention.
Figure 2 shows a vector diagram showing various color difference signals which are contained in a received modulated color subcarrier.

Consider first the block diagram of the color television receiver shown in Figure 1. A study of the operational functions required in a typical color television receiver will best illustrate the need for the usefulness of the present invention.

In the circuit shown in Figure 1, the incoming television signal arrives at the antenna 11 and is impressed on the television signal receiver 13. In the television signal receiver 13, numerous functions such as first detection, intermediate frequency amplification, second detection, and automatic gain control are performed. These and other functions are described, for example, in the paper entitled, "Television Receivers" by Antony Wright as published in the March 1947 issue of the RCA Review. The recovered color television signal information then includes not only the luminance and chrominance information, but also the sound information which is transmitted on a frequency modulated carrier displaced 4½ mcs. from the video carrier.

The audio information may be obtained from the recovered color television signal by utilizing, for example, the well known principles of intercarrier sound, in the audio detector and amplifier 15 where the audio information is also amplified and applied to the loud speaker 17.

One branch of the color television receiver, to which the color television signal is applied, is concerned with the deflection circuits associated with the color kinescope 29. The color television signal is applied to the deflection circuits and high voltage supply 19 which apply vertical and horizontal deflection signals to the yoke 31 and also a high voltage to the ultor 33. In addition, the deflection circuits and high voltage supply 19 also serve to energize the kickback voltage generator 21 which produces a gate pulse 22 during the kickback period. The gate pulse 22 is applied to the burst separator 23 to which is also applied the color television signal.

The burst separator 23 is essentially a gate circuit which is responsive to the gate pulse 22 and which yields separation of the color synchronizing burst from the color television signal. The separated color synchronizing burst may then be utilized to synchronize the phase and frequency of the burst-sync reference signal source 25 by employing one of several well known methods, among which are reactance tube frequency control, injection-locking, or the use of ringing circuit techniques. The output of the burst-sync reference signal source is then an accurately phased synchronized signal whose phase is prescribed by that of the color synchronizing burst.

Since synchronous detection involves the use of reference signals at phases corresponding to the hues or color difference signals to be detected, the output of the burst-sync reference signal source 25 is applied to the phase shifter 27 which then applies appropriately phased signals to the X demodulator 45 and the Z demodulator 43. At the same time, the color television signal supplied by the television signal receiver 13 is passed through the high pass filter 39 which has a cut off frequency at 2 mc., thereby permitting the transmission of all I and Q components which flank the color subcarrier. Utilizing, for example, the potentiometer 41 for amplitude control, the filtered modulated subcarrier is then impressed on the Z demodulator 43 and the X demodulator 45 at whose output terminals 49 and 51, respectively, appear the Z color difference signal and the X color difference signal. The Z color difference signal and the X color difference signal are then impressed on the matrix 47 in which, utilizing principles taught by the present invention which will be described in detail later in the specifications, B–Y, G–Y and R–Y color difference information is produced. This color difference information is applied to appropriate control electrodes of the color kinescope 29.

In addition, the color televison signal representing luminance information, is passed through the Y delay 35, the Y amplifier 37 and is applied to the cathodes of the color kinescope 29 in such a way that signal addition between the Y information and the respective B–Y, G–Y and R–Y signals applied to the control electrode is accomplished in a manner whereby, in conjunction with the deflection signals applied to the yoke 31, the recovered color television image is caused to appear on the image face of the color kinescope 29.

Consider now the operation of the matrix 47 which accepts the Z and X color difference signals from the Z demodulator 43 and the X demodulator 45. These demodulators may be conventional demodulators; however, if they are of the diode type such as that described in the paper entitled, "Color television signal receiver demodulators" by Pritchard and Rhodes in the June 1953 issue of the RCA Review, and if appropriate pairing of these demodulators is accomplished, then the advantages of D.-C. coupling and simplicity of operation will be added to the system. The advantage of having D.-C. coupling eliminates the necessity of including expensive and complicated D.-C. restorers in the final circuits.

The matrix circuit making up the matrix 47 is based on the use of the three electron tubes 63, 81 and 93, whose cathodes 65, 75 and 89, respectively, are coupled through the common resistors 61 to ground. In the plate circuits of each of the three electron tubes is included an output load having proper frequency characteristics with the output load 71 associated with electron tube 63, the output load 83 associated with electron tube 81, and the output load 95 associated with the electron tube 93. Each of these output loads utilizes a series inductance of 2 mh.

The Z color-difference signal as provided by the Z demodulator 43 is passed through the filter circuit 53 which filters out those high frequency components above 1.5 mc. and impresses the filtered Z color difference signal on the control grid 67. The X demodulator 45, in like fashion, passes the X color-difference information through the filter circuit 55 which removes those signal components above substantially 1.5 mc. and applies the filtered X color-difference signal to the control grid 87. Note that the control grid 77 of the electron tube 81, is coupled to ground.

An understanding of the fundamental operation of the matrix 47 can be achieved by considering first the case where, for example, an R–Y signal is applied to the electron tube 63 and B–Y phase is applied to the electron tube 93. If the circuits involving electron tubes 63 and 93 were mutually coupled, then an amplified and inverted R–Y and B–Y signal would be realized respectively in each of the output circuits 71 and 95. Then, by utilizing a suitable adder network, a G–Y signal could be formed according to the proportions of R–Y and B–Y information as prescribed in Equation 5.

By utilizing the common cathode resistance 61 and the third electron tube 81, provisons are made whereby the inversion of color difference signal information in each of the electron tubes 63, 81 and 93 is accomplished. This requires signal demodulation at phases removed from the quadrant of the R–Y, and B–Y signals shown in Figure 2 so that the negative values of R–Y and B–Y signals will appear across the common cathode resistor 61. These negative values are essential for the formation of the G–Y signal which, since the electron tube 81 is, essentially speaking, cathode driven, is produced in the output circuit of this tube. However, due to the use of the common cathode resistor 61, the X and Z color difference information applied to the control grids 67 and 87 will be vectorially combined in the common cathode resistor 61. If a pure B–Y signal is to be produced in the plate circuit 71 of the electron tube 63, and if a pure B–Y signal is to be produced in the output circuit 95 of the electron tube 93, then it is essential that the color difference signal demodulation be employed not at the phases bearing 180° relationship to the R–Y and B–Y signals, but at the X and Z phases shown in Figure 2. The reason for the adoption of the X and Z color difference signal phases is best illustrated by the following development:

Assume the condition whereby in each of the three amplifier tubes, $$g_m \times R_k = 1 \quad (6)$$

where $g_m$ is the transconductance of the tube. Then the voltage across the resistance $R_k$ can be expressed by the simultaneous equations $$(X-(G-Y))+(Z-(G-Y))+(O-(G-Y))=G-Y \quad (7)$$

$$(X-(G-Y))=K_1(R-Y) \quad (8)$$

$$(Z-(G-Y))=K_2(B-Y) \quad (9)$$

where $K_1$ and $K_2$ are constants. Equations 7, 8, and 9 may be written in the form $$X+Z=4(G-Y) \quad (10)$$

$$X=K_1(R-Y)+(G-Y) \quad (11)$$

$$Z=K_2(B-Y)+(G-Y) \quad (12)$$

or $$K_1(R-Y)+K_2(B-Y)=2(G-Y) \quad (13)$$

which, using Equation 1, can be written in the form $$K_1(R-Y)+K_2(B-Y)=2-(\tfrac{11}{59}(B-Y)-\tfrac{30}{59}(R-Y)) \quad (14)$$

$K_1$ and $K_2$ then are found to be $$K_1=-2\tfrac{30}{59} \quad (15)$$

$$K_2=-2\tfrac{11}{59} \quad (16)$$

The X and Z color difference signals may then be described in terms of R–Y and B–Y as follows:

$$X=-3\tfrac{30}{59}(R-Y)-\tfrac{11}{59}(B-Y) \quad (17)$$

$$Z=-\tfrac{30}{59}(R-Y)-\tfrac{33}{59}(B-Y) \quad (18)$$

from which it follows for example that Z lags the burst which is 180° out of phase with respect to the B–Y signal by 27.2° while the X color difference signal leads the B–Y signal by 102.2°. It also follows that a phase difference of 50.6° exists between the X and Z color difference signals.

Thus far, the discussion of the teachings of the present invention has followed closely the teachings described in the previous application of Dalton H. Pritchard, entitled, "Color Television," United States Serial No. 432,413, filed May 26, 1954, and referred to above. However, it is now desirable that full usage be made of the signal information present at the I color difference signal phase. The I signal phase has signal components up to the vicinity of 1½ mc. and their usage in the production of a color television image in the color television receiver will materially improve edge definition and fidelity of color detail. It has been pointed out that in the mode of operation described for the matrix 47, the X demodulator 45 and the Z demodulator 43 operate at a phase difference of 50.6°. Upon examination of the phase relationship of the X and Z signals shown in Figure 2, it is seen that the Z color difference signal has a phase very nearly equal to that of a —Q signal and that the X color difference signal contains a component of —Q and a component of —I. It is easily shown by simple trigonometry that the Q component of the X color difference signal and the I component of the X color difference signal may be approximately described by the following relationships:

$$X_Q=X \sin 45.2° \quad (19)$$

$$X_I=X \cos 45.2° \quad (20)$$

Assuming for the moment that the X color difference signal was exactly phased along the I signal axis, the only function necessary to provide I and Q operation would be to narrow the bandwidth of the Z color difference signal which is substantially a Q axis signal and to provide time delay compensation for the X color difference signal. However, since the X color difference signal contains the components of both I and Q according to the relationships given in Equations 19 and 20, it is necessary that the two functions be performed. One of the functions involves that of removing the frequency components above 0.5 mc. to the Z color difference signal and the other is that of removing the frequency components above 0.5 mc. in the Q component of the X color difference signal, leaving only the I components in the single side band regions above 0.5 mc. This is accomplished as follows:

In order to remove the signal components above 0.5 mc. from the Z color difference signal, it is only necessary to bypass these frequencies above this value to ground, using an appropriate RC time constant circuit although in a more elaborate circuit it might be more expedient to use a low-pass or band-pass filter network. However, these frequency components above 0.5 mc. are those components which can be utilized in the proper polarity to cancel out those Q signal components above 0.5 mc. in the X color difference signal, leaving only I components extending out to 1.5 mc. and thereby resulting in I and Q operation. This can be accomplished to a satisfactory degree by choosing a capacitor value which, with proper matching of the Z demodulator output impedance and with a suitable value of resistance of common cathode resistor 61, forms the proper time constant to properly by-pass signals in the frequency region between 0.5 mc. and 1.5 mc. The capacitor 59 is, therefore, connected between the control grid 67 and the connecting point 62 which represents the off ground terminal of the common cathode resistor 61. The common cathode impedance is sufficiently low in relationship to the output impedance of the Z demodulator 43 to provide the bypassing action required to remove the Z color difference signal components above 0.5 mc. At the same time, these same frequency components are applied to the matrix circuit to be produced across the common cathode resistor 61 in proper polarity relationship to cancel out the Q signal components existing in the X color difference signal output, resulting in R–Y, B–Y and G–Y signals below 0.5 mc. and operation along the I axis in the single side band region between 0.5 mc. and 1.5 mc.

Adequate X color difference signal time-delay compensation is accomplished in the particular embodiment of the matrix 47 by the use of the extra filter section composed of the inductance 56 and the capacitor 54.

Thus, utilizing the present invention, in the circuit feeding the X color difference signal to the control grid 87, the entire demodulator and matrix combination provides high level color difference signals in the output terminals 73, 85 and 97, with full utilization of the color difference information signal contained in the transmitting signal.

Having described the invention, what is claimed is:

1. A matrix circuit including a plurality of amplifier tubes each having a control grid, an anode and a cathode, a fixed potential terminal, a mutual impedance, means for coupling the cathodes of said amplifier tubes together to form a common cathode terminal, means for coupling said mutual impedance between said common cathode terminal and said fixed potential terminal, a first input terminal coupled to the control grid of one of said amplifier tubes, a second input terminal coupled to the control grid of another of said amplifier tubes, means for coupling the control grid of the last of said amplifier tubes to said fixed potential terminal, a first output circuit coupled to the anode of said one amplifier tube, a second output circuit coupled to the anode of said other amplifier tube, a further output circuit coupled to the anode of the said last amplifier tube, a signal translating circuit, said signal translating circuit having predetermined frequency characteristics and coupled between said first input terminal and said common cathode terminal whereby prescribed signal frequencies translated by said signal translating circuit are caused to have predetermined phase relationship to any signal developed at said common cathode terminal having said prescribed signal frequencies.

2. A signal matrix adapted to produce a trio of signals from a pair of prescribed signals, each of said pair of prescribed signals having a first frequency range and a second frequency range, said first frequency range relating to a first type of signal information and said second frequency range relating to a second type of signal information, having a prescribed phase relationship as referred to a reference phase, said signal matrix including, a first amplifier circuit, a second amplifier circuit, and a third amplifier circuit, each of said amplifier circuits having an input circuit and an output circuit, means for coupling the first of said pair of prescribed signals to the input circuit of said first amplifier circuit, means for coupling the second of said pair of prescribed signals to the input circuit of the second of said amplifier circuits, a mutual coupling network between said first amplifier circuit and said second amplifier circuit and said third amplifier circuit, whereby said pair of prescribed signals are combined in said mutual coupling network to form a combined signal and wherein signals produced in said output circuits of said first, second, and third amplifier circuits are formed by predetermined combinations of said combined signal and predetermined quantities of each of said pair of prescribed signals in at least said first frequency range, a signal translating network, said signal translating network coupled between the input circuit of said first amplifier circuit and said mutual coupling network, said signal translating circuit characterized in that it translates selected frequencies of said second frequency range to provide signal by-passing in said second frequency range and also to produce cancellation of signal components of said combined signal not adhering to said prescribed phase relationship in said second frequency range, whereby each of said amplifier circuits is caused to develop one of said trio of signals characterized in that it yields said first type of signal in said first frequency range and said second type of signal in said second frequency range.

3. In a color television receiver adapted to receive a color television signal including a color subcarrier containing a plurality of color information signals, each of said plurality of color information signals having a predetermined phase as referred to a reference phase, said color information signals including a first color information signal, a second color information signal, a third color information signal, a fourth color information signal, a fifth color information signal, a sixth color information signal and a seventh color information signal, said first, second and third color information signals characterized in that they describe component color signals in at least a first range of selected signal frequencies and which may be utilized for color image reproduction, said fourth and fifth color information signals characterized in that they may be combined to form said first, second and third color information signals according to predetermined combinations, said fourth and fifth color information signals also characterized in that they each contain prescribed portions of said sixth and seventh color information signals, said sixth and seventh color information signals characterized in that said sixth color information signal contains color image definition information in said first range of selected signal frequencies and at least frequency components in a second range of selected signal frequencies and whereby said seventh color information signal contains color definition information in both said first range of selected signal frequencies and also said second range of selected signal frequencies, said second range of selected signal frequencies being higher in frequency than said first range of selected signal frequency, a matrix means adapted to accept signals corresponding to said fourth and fifth color information signals and to produce output signals corresponding to said first, second and third color information signals, comprising in combination, three amplifier devices, each of said amplifier devices having at least a first control electrode, a second control electrode and an output electrode, and an output circuit, each of said output circuits having predetermined frequency characteristics and coupled to said output electrode, a fixed potential point, means for coupling each of said second control electrodes of said three amplifier devices together to form a common terminal, an impedance coupled between said common terminal and said fixed potential point, means for coupling a signal corresponding to said fourth color information signal to the first control electrode of said first amplifier device, means for coupling said fifth color information signal to the first control electrode of said second amplifier device, means for coupling said first control electrode of said third amplifier device to a reference potential terminal, means for adjusting the amplification of said first, second and third amplifier devices whereby said fourth and fifth color information signals are combined across said impedance in proportions suitable to yield said first, second and third color information signals in the output circuits of said first, second and third amplifier devices, for at least said first range of selected signal frequencies, respectively, a coupling network connected between said first control electrode of said first amplifier device and said impedance whereby signals in said second range of selected signal frequencies of said sixth color information signal are by-passed to said fixed potential point, and are also caused to be developed across said impedance to produce cancellation of signals in said second range of selected signal frequencies corresponding to said sixth color information signal as developed across said impedance resulting from said fourth color information signal and said fifth color information signal being applied, respectively, to the said first control electrodes of said first amplifier device and said second amplifier device, respectively, whereby signal frequencies in said second range of selected signal frequencies contained in said seventh color information signal are utilized in the combining of said fourth and fifth color information signals across said impedance whereby said first, second and third color information signals appearing in the output circuits of said first, second and third amplifier devices, respectively, contain the color definition information provided by said seventh color information signal in said second range of selected signal frequencies.

4. In a color television receiver adapted to receive a color television signal, said color television signal including a color subcarrier containing a plurality of color information signals, each of said plurality of said color information signals having a predetermined phase as referred to a reference phase, said color information signals including a first color information signal, a second color information signal, a third color information signal, a fourth color information signal, a fifth color information signal, a sixth color information signal, and a seventh color information signal, said first, second and third color information signals characterized in that they describe component color signals in at least a first range of selected signal frequencies and which may be utilized for color image reproduction, said fourth and fifth color information signals characterized in that they may be combined to form said first, second and third color information signals according to prescribed combinations, said fourth and fifth color information signals also characterized in that they each contain prescribed portions of said sixth and seventh color information signals, said sixth and seventh color information signals characterized in that said sixth color information signal contains color definition information in said first range of selected signal frequencies and frequency components in a second range of selected signal frequencies and whereby said seventh color information signal contains color definition information in both said first range of selected signal frequencies and also said second range of selected signal frequencies, said second range of selected signal frequencies being higher in frequency than said first range of selected signal frequencies, a matrix means adapted to accept signals corresponding to said fourth and fifth color information signals and to produce output signals corresponding to said first, second and third color information signals comprising in combination, three amplifier means, each having an input circuit, an output circuit, and at least an output signal control means, a fixed potential point, means for coupling each of said output signal control means of said three amplifier means together to form a common terminal, an impedance coupled between said common terminal and said fixed potential point, means for coupling a signal corresponding to said fourth color information signal to the input circuit of said first amplifier means, means for coupling said fifth color information signal to the input circuit of said second amplifier means, means for coupling said input circuit of said third amplifier means to a reference potential terminal, means for adjusting the amplification of said first, second and third amplifier means whereby said fourth and fifth color information signals are combined across said impedance in proportions suitable to yield said first, second and third color information signals in the output circuits of said first, second and third amplifier means for said first range of selected signal frequencies respectively, a coupling network connected between said input circuit of said first amplifier means and said impedance whereby signals in said second range of selected signal frequencies of said sixth color information signal are by-passed to said fixed potential point and also are caused to be developed across said impedance to produce cancellation of signals in said second range of selected signal frequencies corresponding to said sixth color information signal as developed across said impedance resulting from said fourth color information signal and said fifth color information signal being applied, respectively, to said input circuits of said first amplifier means and said second amplifier means and whereby signal frequencies in said second range of selected signal frequencies contained in said seventh color information signal are utilized in the combining of said fourth and fifth color information signals across said impedance whereby said first, second and third color information signals appearing in the output circuits of said first, second and third amplifier means, respectively, contain the color definition information contained by said seventh color information signal in said second range of selected frequencies.

5. In a color television receiver adapted to receive a color television signal, said color television signal including a color subcarrier containing a plurality of color information signals, each of said plurality of color information signals having a predetermined phase as referred to a reference phase, said color information signals including a first color information signal, a second color information signal, a third color information signal, a fourth color information signal, a fifth color information signal, a sixth color information signal and a seventh color information signal, said first, second and third color information signals characterized in that they describe component color signals in at least a first range of selected signal frequencies and which may be utilized for color image reproduction, said fourth and fifth color information signals characterized in that they may be combined to form said first, second and third color information signals according to predetermined combinations, said fourth and fifth color information signals also characterized in that they each contain prescribed portions of said sixth and seventh color information signals, said sixth and seventh color information signals characterized in that said sixth color information signal contains color image definition information in said first range of selected signal frequencies and at least frequency components in a second range of selected signal frequencies and whereby said seventh color information signal contains color definition information in both said first range of selected signal frequencies and also said second range of selected signal frequencies, said second range of selected signal frequencies being higher in frequency than said first range of selected signal frequency, a matrix means adapted to accept signals corresponding to said fourth and fifth color information signals and to produce output signals corresponding to said first, second and third color information signals, comprising in combination, three electron tubes each having a control grid, a cathode, an anode and an output circuit, said output circuit having predetermined frequency characteristics and coupled to said anode, means for coupling said cathodes of said three electron tubes together to form a common terminal, a fixed potential point, an impedance coupled between said common terminal and said fixed potential point, means for coupling a signal corresponding to said fourth color information signal to the control grid of said first electron tube, means for coupling said fifth color information signal to the control grid of said second electron tube, means for coupling said control grid of said third electron tube to said fixed potential point, means for adjusting the operation of said first, second and third electron tubes whereby said fourth and fifth color information signals are combined across said impedance in proportions suitable to yield said first, second and third color information signals in the output circuits of said first, second and third electron tubes, respectively, for at least said first range of selected signal frequencies, a by-passing coupling device connected between said control grid of said first electron tube and said impedance, whereby signals of said second range of selected signal frequencies of said sixth color information signal are by-passed to said fixed potential point and are also caused to be developed across said impedance to produce cancellation of signals in said second range of selected signal frequencies corresponding to said sixth color information signal as developed across said impedance resulting from said fourth color information signal and said fifth color information signal being applied, respectively, to the control grids of said first and second electron tubes, respectively, and whereby signal frequencies in said second range of selected signal frequencies contained in said seventh color information signal are utilized in the combining of said fourth and fifth color information signal across said impedance whereby said first, second and third color information signals appearing in the output circuits of said first, second and third electron tubes, respectively, contain the color definition information contained by said seventh color information signal in said second range of selected signal frequencies.

6. In a color television receiver adapted to receive a color television signal, said color television signal including a subcarrier containing a plurality of color information signals, each of said plurality of color information signals having a predetermined phase as referred to a reference phase, said color information signals including a first color information signal, a second color information signal, a third color information signal, a fourth color information signal, a fifth color information signal, a sixth color information signal and a seventh color information signal, said first, second and third color information signals characterized in that they describe component color signals in at least a first range of selected signal frequencies and which may be utilized for color image reproduction, said fourth and fifth color information signals characterized in that they may be combined to form said first, second and third color information signals according to predetermined combinations, said fourth and fifth color information signals also characterized in that they each contain prescribed portions of said sixth and seventh color information signals, said sixth and seventh color information signals characterized in that said sixth color information signal contains color image definition information in said first range of selected signal frequencies and at least frequency components in a second range of selected signal frequencies and whereby said seventh color information signal contains color definition information in both said first range of selected signal frequencies and also said second range of selected signal frequencies, said second range of selected signal frequencies being higher in frequency than said first range of selected signal frequency, a matrix means adapted to accept signals corresponding to said fourth and fifth color information signals and to produce output signals corresponding to said first, second and third color information signals, comprising in combination, three amplifier devices, each of said amplifier devices having at least a first control electrode, a second control electrode and an output electrode, and an output circuit, each of said output circuits having predetermined frequency characteristics and coupled to said output electrode, a fixed potential point, means for coupling each of said second control electrodes of said three amplifier devices together to form a common terminal, a resistor coupled between said common terminal and said fixed potential point, means for coupling a signal corresponding to said fourth color information signal to the first control electrode of said first amplifier device, means for coupling said fifth color information signal to the first control electrode of said second amplifier device, means for coupling said first control electrode of said three amplifier devices to a reference potential terminal, means for adjusting the amplification of said first, second and third amplifier devices whereby said fourth and fifth color information signals are combined across said resistor in proportions suitable to yield said first, second and third color information signals in the output circuits of said first, second and third amplifier devices, for at least said first range of selected signal frequencies, respectively, a capacitor network connected between said first control electrode of said first amplifier device and said resistor whereby signals in said second range of selected signal frequencies of said sixth color information signal are by-passed to said fixed potential point, and are also caused to be developed across said resistor to produce cancellation of signals in said second range of selected signal frequencies corresponding to said sixth color information signal as developed across said resistor resulting from said fourth color information signal and said fifth color information signal being applied, respectively, to the said first control electrodes of said first amplifier device and said second amplifier device, respectively, whereby signal frequencies in said second range of selected signal frequencies contained in said seventh color information signal are utilized in the combining of said fourth and fifth color information signals across said resistor whereby said first, second and third color information signals appearing in the output circuits of said first, second and third amplifier devices, respectively, contain the color definition information provided by said seventh color information signal in said second range of selected signal frequencies.

7. In a color television receiver adapted to receive a color television signal, said color television signal including a Y signal and a color subcarrier containing a plurality of color information signals, each of said plurality of color information signals having a predetermined phase as referred to a reference phase, said color information signal including an R–Y signal, a B–Y signal, a G–Y signal, a Z signal, an X signal, a Q signal, and an I signal, said B–Y, R–Y and G–Y signals characterized in that they describe color difference information in at least a first range of selected signal frequencies and may be utilized in conjunction with a Y signal for color image reproduction, said Z and X information signals characterized in that they may be combined to form R–Y, B–Y and G–Y signals according to prescribed combinations, said Z and X signals also characterized in that they contain prescribed portions of said I and Q signals, said I and Q signals characterized in that said Q signal contains color definition information in said first range of selected signal frequencies and at least frequency components in a second range of selected signal frequencies and whereby said I signal contains color definition information in both said first range of selected signal frequencies and also said second range of selected signal frequencies, said second range of selected signal frequencies being higher in frequency than said first range of selected signal frequencies, a matrix circuit adapted to accept X and Z signals and to produce G–Y, B–Y and R–Y signals comprising in combination, three amplifier means, each having an input circuit, an output circuit and at least an output signal control means, a fixed potential point, means for coupling each of said output signal control means of said three amplifier means together to form a common terminal, an impedance coupled between said common terminal and said fixed potential point, means for coupling said Z signal to said input circuit of said first amplifier means, means for coupling said X signal to said input circuit of said second amplifier means, means for coupling said input circuit of said three amplifier means to a reference potential terminal, means for adjusting amplification of said first, second and third amplifier means whereby said X and Z signals are combined across said impedance in proportions suitable to yield said R–Y, B–Y and G–Y signals in the output circuits of said first, second and third amplifier means, respectively, for at least said first range of selected signal frequencies, a coupling network coupled between said input circuit of said first amplifier means and said impedance whereby signals in said second range of selected signal frequencies of said Q signal as contained in said Z signal are by-passed to said fixed potential point and are also caused to be developed across said impedance to produce cancellation of signals in said second range of selected signal frequencies corresponding to said Q signal as developed across said impedance resulting from said Z signal and said X signal being applied, respectively, to said input circuits of said first amplifier means and said second amplifier means and whereby signal frequencies in said second range of selected signal frequencies contained in said I signal are also utilized in the combining of said Z and X signals across said impedance whereby said R–Y, B–Y, and G–Y signals appearing in the output circuits of said first, second and third amplifier means, respectively, contain the color definition information contained by said I signal in said second range of selected signal frequencies.

8. In a color television receiver adapted to receive a color television signal, said color television signal including a Y signal and a color subcarrier containing a plurality of color information signals, each of said plurality of color information signals having a predetermined phase as referred to a reference phase, said color information signal including an R–Y signal, a B–Y signal, a G–Y signal, a Z signal, an X signal, a Q signal, and an I signal, said B–Y, R–Y and G–Y signals characterized in that they describe color difference information in at least a first range of selected signal frequencies and may be utilized in conjunction with a Y signal for color image reproduction, said Z and X information signals characterized in that they may be combined to form R–Y, B–Y and G–Y signals according to prescribed combinations, said Z and X signals also characterized in that they contain prescribed portions of said I and Q signals, said I and Q signals characterized in that said Q signal contains color definition information in said first range of selected signal frequencies and at least frequency components in a second range of selected signal frequencies and whereby said I signal contains color definition information in both said first range of selected signal frequencies and also said second range of selected signal frequencies, said second range of selected signal frequencies being higher in frequency than said first range of selected signal frequencies, a matrix circuit adapted to accept X and Z signals, and to produce G–Y, B–Y, and R–Y signals comprising in combination, three electron control devices, each of said electron control devices having a first control electrode, a second control electrode, an output electrode and an output circuit, said output circuit having predetermined frequency characteristics and coupled to said output electrode, said electron control device characterized in that for every signal applied to said first control electrode, said signal in the same phase will appear at said second control electrode and in reverse phase at said output electrode, a fixed potential point, means for coupling said second control electrodes of each of said three electron control devices together to form a common terminal, an impedance coupled between said common terminal and said fixed potential point, means for coupling said Z signal to said first control electrode of the first of said three electron control devices, means for coupling said X signal to the first control electrode of the second of said three electron control devices, means for coupling the first control electrode of the third of said three electron control devices to a reference potential terminal, means for applying potentials to said three electron control devices whereby said X and Z signals are combined across said impedance in suitable proportions whereby R–Y, B–Y and G–Y signals appear at the respective output circuits of the first, second and third of said three amplifier devices, for at least the first range of selected signal frequencies, a coupling network coupled between said first control electrode of the first of said three electron control devices and said impedance whereby signals in said second range of selected signal frequencies of said Q signal as contained in said Z signal are by-passed to said fixed potential point and are also caused to be developed across said impedance to produce cancellation of signals in said second range of selected signal frequencies corresponding to said Q signal as developed across said impedance resulting from said Z signal and said X signal being applied respectively, to the first control electrodes of the first and second of said electron devices and whereby signal frequencies in said second range of selected signal frequencies contained in said I signal are also utilized in the combining of said Z and X signals across said impedance whereby said R–Y, B–Y and G–Y signals appearing in the output circuits of the first, second and third of said three electron control devices, respectively, contain the color definition information contained by said I signal in said second range of selected signal frequencies.

9. In a color television receiver adapted to receive a color television signal, said color television signal including a Y signal and a color subcarrier containing a plurality of color information signals, each of said plurality of color information signals having a predetermined phase as referred to a reference phase, said color information signal including an R–Y signal, a B–Y signal, a G–Y signal, a Z signal, an X signal, a Q signal, and an I signal, said B–Y, R–Y, and G–Y signals characterized in that they describe color difference information in at least a first range of selected signal frequencies and may be utilized in conjunction with a Y signal for color image reproduction, said Z and X information signals characterized in that the X signal lags the B–Y signal by approximately 100° and leads the Z signal by approximately 50° and that they may be combined to form R–Y, B–Y and G–Y signals according to prescribed combinations, said Z and X signals also characterized in that they contain prescribed portions of said I and Q signals, said I and Q signals characterized in that said Q signal contains color definition information in said first range of selected signal frequencies and at least frequency components in a second range of selected signal frequencies and whereby said I signal contains color definition information in both said first range of selected signal frequencies and also said second range of selected signal frequencies, said second range of selected signal frequencies being higher in frequency than said first range of selected signal frequencies, a matrix circuit adapted to accept X and Z signals and to produce G–Y, B–Y, and R–Y signals comprising in combination, three amplifier tubes, each having at least a control grid, an anode, and a cathode, and an output circuit, said output circuit having predetermined frequency characteristics and coupled to said anode, a fixed potential point, means for coupling each of said cathodes together to form a common terminal, a resistance coupled between said common terminal and said fixed potential point, means for coupling said Z signal to said control grid of the first of said three amplifier tubes, means for coupling said X signal to the control grid of the second of said three amplifier tubes, means for coupling the control grid of the third of said three amplifier tubes to a reference potential terminal, means for adjusting the amplification of said three amplifier tubes whereby said X and Z signals are combined across said resistance in proportions suitable to yield said R–Y, B–Y and G–Y signals in the output circuits, respectively, of the first, second and third of said three amplifier tubes for at least said first range of selected signal frequencies, a capacitor device coupled between said control electrode of the first of said three amplifier tubes and said resistance whereby signals in said second range of selected signal frequencies of said Q signal as contained in said Z signal are by-passed to said fixed potential point and are also caused to be developed across said resistor to produce cancellation of signals in said second range of selected signal frequencies corresponding to said Q signal as developed across said resistance, resulting from said Z signal and X signal, said Z signal and said X signal being applied respectively to the control grids of the first and second of said three amplifier tubes and whereby signal frequencies in said second range of selected signal frequencies contained in said I signal are also utilized in the combining of said Z and X signals across said resistance whereby said R–Y, B–Y and G–Y signals appearing in the output circuits, respectively, of the first, second and third of said three amplifier tubes contain the color definition information contained by said I signal in said second range of selected signal frequencies.

No references cited.